March 1, 1949.                H. L. BOWERS                2,463,351
                    AIRCRAFT AND UNDERCARRIAGE THEREFOR Filed Oct. 23, 1947                            3 Sheets-Sheet 1

INVENTOR
Herbert L. Bowers
BY
Beau, Brooks, Buckley & Beau.
ATTORNEYS

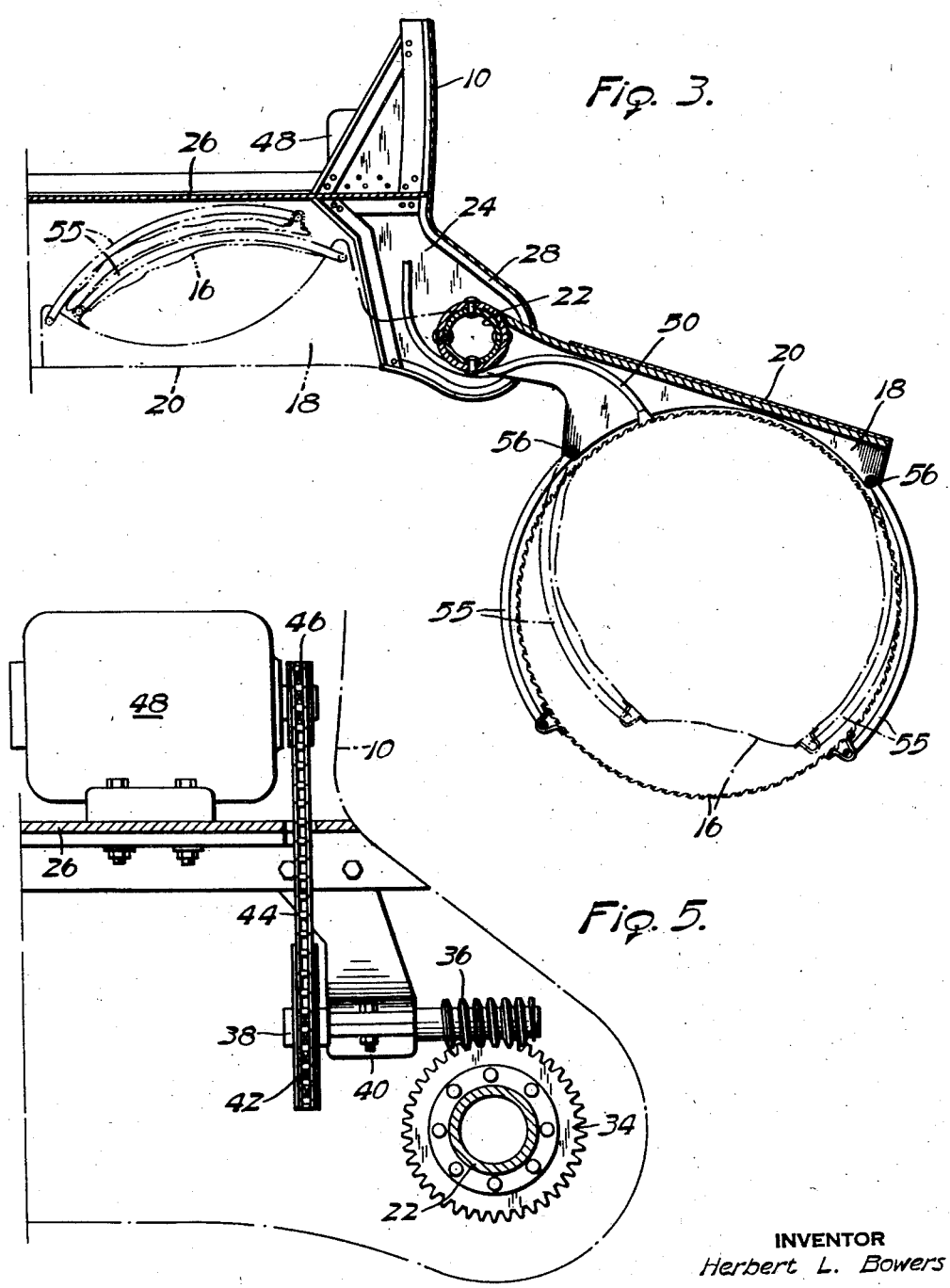

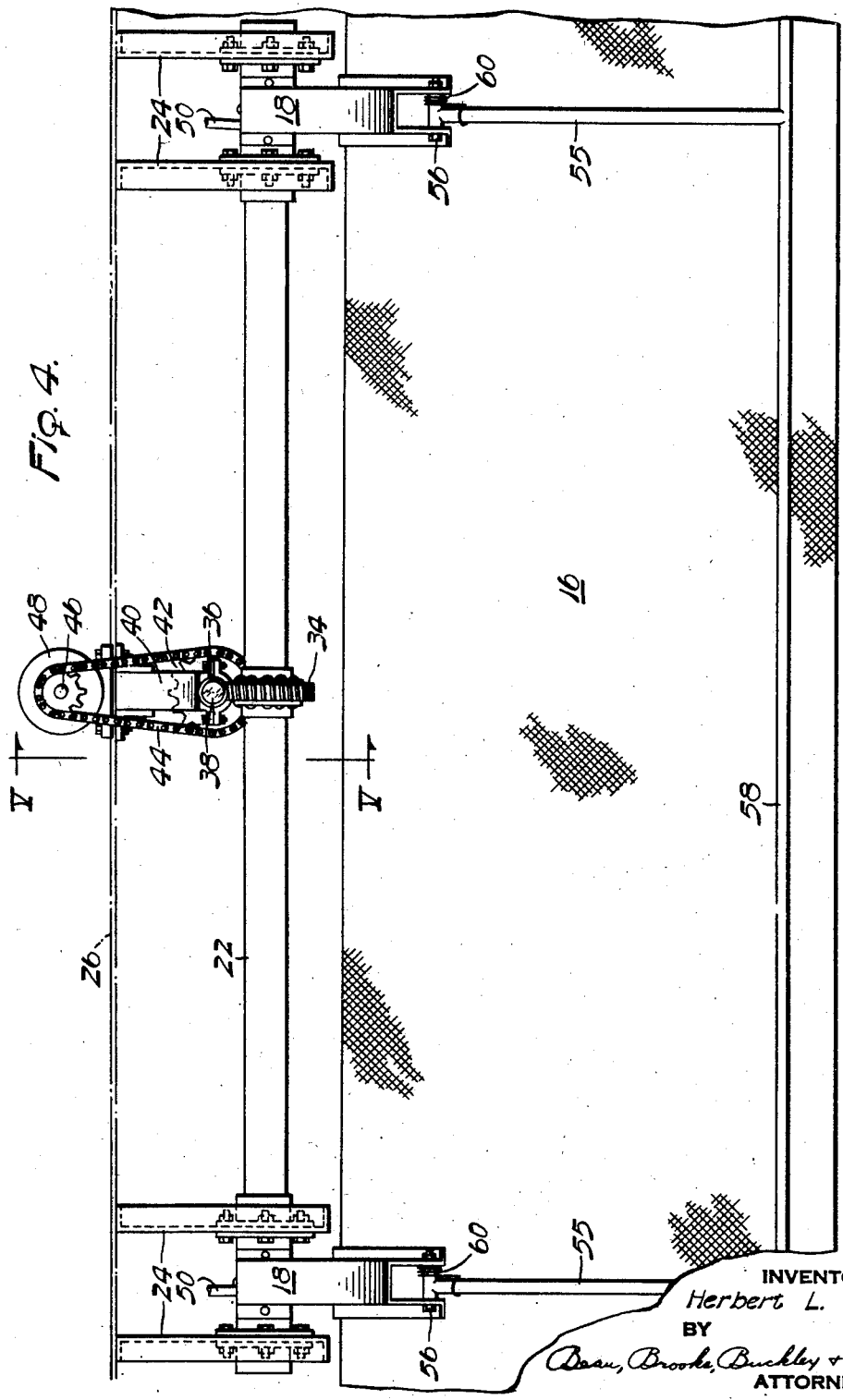

Patented Mar. 1, 1949

2,463,351

UNITED STATES PATENT OFFICE 2,463,351

AIRCRAFT AND UNDERCARRIAGE THEREFOR

Herbert L. Bowers, Greiner Road, N. Y., assignor to Bell Aircraft Corporation, Wheatfield, N. Y.

Application October 23, 1947, Serial No. 781,584

7 Claims. (Cl. 244—102)

This invention relates to helicopter aircraft, and more particularly to improvements in amphibious landing means for helicopter aircraft and the like.

It is generally known that the flexible air cell type flotation gear is particularly suited to render helicopter aircraft amphibious, and that they provide good shock absorbing characteristics in connection with water and/or ground landing operations. Also, such cells are quite practicable in connection with helicopter water landing and take-off operations because of the fact that vertically rising and landing aircraft do not require take-off or landing runs. However, the inflated cell type landing gear units are usually relatively bulky and therefore create excessive aerodynamic drag under flying conditions, and it is an object of the present invention to provide an improved inflatable cell type landing and flotation gear for helicopter aircraft and the like, whereby to provide improved landing performance while avoiding excessive drag under flying conditions.

Another object of the invention is to provide an improved arrangement for landing and flotation gear in vertically rising aircraft, whereby the gear retracts substantially into the contour of the aircraft body under flying conditions and is extendable and inflatable in improved manner preparatory to landing upon ground or water surfaces. Other objects and advantages of the invention will appear in the specification hereinafter.

In the drawings:

Fig. 3 is a fragmentary section, on an enlarged scale, taken along line III—III of Fig. 1;

Fig. 4 is a detail of the gear actuating mechanism; and

Fig. 5 is a fragmentary section, on an enlarged scale taken along line V—V of Fig. 4.

Figure 1:
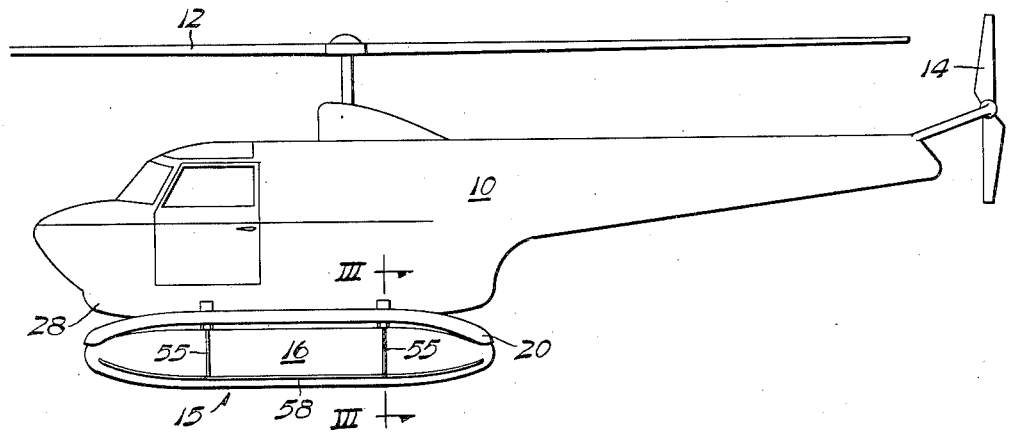
Fig. 1 is a side elevation of a helicopter embodying the invention.

The invention is illustrated in the drawing (Fig. 1) in connection with a helicopter aircraft which comprises generally a body 10, a lift rotor 12, a directional control tail propeller 14, and a landing-flotation gear designated generally at 50. As shown in greater detail in the other figures of the drawing, the landing-flotation gear comprises a pair of inflatable cells 16—16 which are supported, by means to be described in detail hereinafter, to extend in parallel relation at opposite sides of the aircraft body and therebelow, whereby the aircraft may descend into contact with either a ground or water surface to be thereby supported through the medium of the cells 16—16.

The cells 16—16 may be constructed of any suitable fabric which is substantially gas tight and flexible so that when the cells are deflated the fabric will readily fold so that the cell material may be stowed within cavity portions of the aircraft body. For example, the cells 16—16 may be constructed of rubberized or plastic impregnated cloth, and will be so cut and sewn as to give the cells cigar-like configurations when inflated (Figs. 1—2).

The cell fabrics are attached to the aircraft by means of sewn or cemented tabs connected to brackets 18—18 carrying cover plates 20. The brackets 18—18 are hinged to the aircraft body by means of shafts 22 which are carried upon bearing brackets 24—24 extending below the floor structure 26 of the aircraft body. The shafts 22—22 extend along opposite sides of the aircraft body and are directed parallel to the longitudinal axis thereof, whereby it will be understood that the cell carrying brackets and cover plates are hingedly carried by the aircraft so as to be pivotable thereon between extended positions thereof as indicated in solid lines Figs. 1—2—3, and retracted positions as illustrated by broken lines in Fig. 3. The cell and cover plate and shaft and bracket elements are so constructed and arranged as to cause the cells to be projected downwardly and outwardly along both sides of the aircraft body when in cell-extended position, for supporting the aircraft upon the cells when alighting upon either a ground or water surface. Also, the parts are so arranged that upon retraction of the gear and deflation of the cell structures the cell material is compactly folded and nested within cavity portions under the aircraft body floor structure, while the cover plates 20—20 are disposed to cover the body cavity openings.

Figure 2:
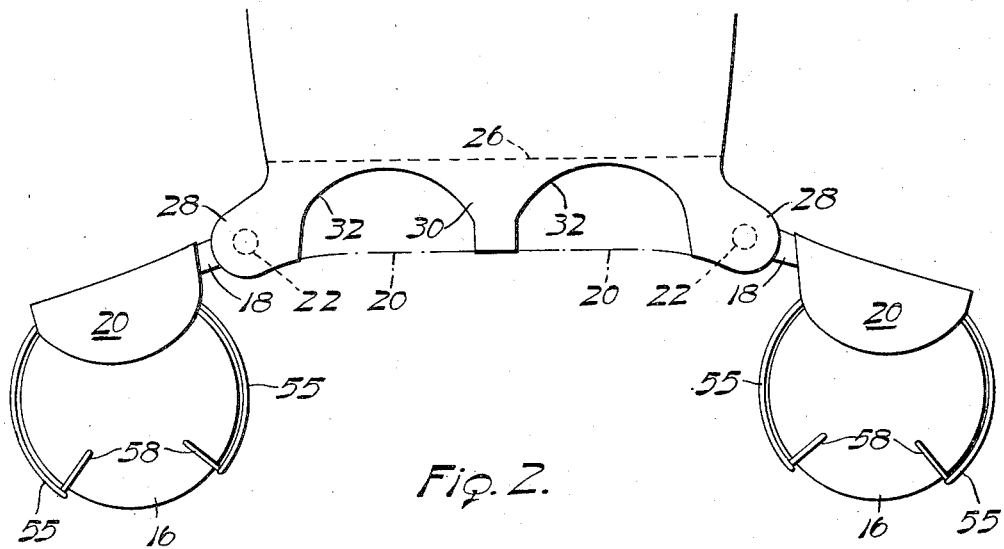
Fig. 2 is a fragmentary front elevation thereof, on a larger scale.

Thus, as illustrated in Figs. 2—3, the cell support brackets 24 are housed within smoothly contoured casings 28—28, and the cell receiving cavity portions of the aircraft body are further defined by smoothly contoured front and rear end walls 30 (Fig. 2) which are recessed as indicated at 32—32 to complement the roundly turned front and rear ends of the cover plates 20—20 when the cells are in retracted position. Thus, it will be understood that when the cells are in retracted positions the cover plates 20—20 will be drawn up into cavity-closing positions as shown in broken lines in Figs. 2—3, so as to provide a completely enclosed aircraft body providing minimum aerodynamic drag.

Any suitable power supply means may be employed for the purpose of motivating retraction-extension movements of the cell units, and as illustrated in Figs. 4—5 such mechanism may conveniently comprise a gear 34 keyed to the shaft 22 and arranged to be driven by a worm 36 which is carried by a jack shaft 38. The shaft 38 is journaled in a bearing 40 supported from the aircraft floor structure, and the shaft 38 mounts a sprocket 42 which is driven by a chain 44 geared to a sprocket 46 keyed to the drive shaft of a motor 48. Thus, reverse direction operation of the motor 48 will cause the cell units to be actuated between extended-retracted positions.

To permit the cell units 16—16 to be compactly nested within the aircraft body cavities, arrangements are made for alternately deflating and inflating the cells coincident with retraction and extension movements thereof. For example, a flexible tube 50 (Fig. 3) is in each case connected at one end to the interior of each cell 16 and extends through the bracket housing and into the interior of the aircraft body for connection at its other end to an air or gas supply means (not shown) which may be provided, for example, either in the form of a compressed air tank or a compressor mechanism, or the like. Suitable inlet-outlet control mechanism will be provided in connection with the conduits 50 so as to provide for either manual or automatic control of the passage of air or gas therethrough, in such direction as to obtain the desired inflation or deflation of the cells. For example, the conduits 50 may connect into a gas generating or storage tank, and the valve control arrangement thereof may be such as to provide for introduction of a fresh charge of gas into the cells as they move from retracted toward extended positions; and for escape of the gas from the cells as they are moved toward retracted positions. Or, an air compressor may be connected to the tubes 50 and so arranged as to operate to inflate the cells as they move toward extended positions, while a conduit valve device permits escape of the air from the cells in conjunction with retraction movements thereof.

To facilitate nesting of the cell materials within the body cavities in as compact a form as possible, the cells 16—16 are each provided with a fabric pleating mechanism which comprises paired frames 55—55 disposed to embrace opposite sides of each of the cells 16—16 when in inflated condition. The frames 55—55 comprise laterally directed struts pivoted at their inner ends by means of pivot connection devices 56 (Fig. 4) to the cover plate brackets 18. At their outer ends the struts 55 are interconnected by means of longerons 58 which extend lengthwise of the cells 16 and curve upwardly at the ends thereof. Thus, in each case the frame work comprising the struts 55 and the longerons 58 substantially encloses the corresponding side of the cell 16 when the latter is inflated. Coil springs 60 (Fig. 4) are provided at the pivot connections 56 between the struts 55 and the brackets 18, and are so arranged as to bias the struts 55 inwardly against the cell 16. Thus, whenever the atmosphere within the cell 16 is permitted to escape therefrom the pleating frames 55—58 press against the cell material so as to accordion-pleat the latter longitudinally of the cell, and as the cell becomes finally deflated the frame 55—58 effects complete folding of the cell material as it is stowed upwardly within the body cavity, as indicated by the broken line showing in Fig. 3. However, upon introduction of atmosphere under pressure to the interior of the cell material, the pressure expands the cell material against the forces of the pleating frame springs, so as to expand the cell into the fully inflated condition thereof as illustrated in solid lines in Figs. 1–3 preparatory for landing.

Thus, it will be appreciated that the structure of the present invention provides a practicable pneumatic cell extension-retraction mounting and control arrangement for helicopter aircraft and the like, whereby an amphibious landing gear of optimum characteristics is provided in conjunction with improved retraction control and stowage features, whereby to eliminate undesirable aerodynamic drag under flight conditions; and that the features and advantages aforesaid are obtained by the present invention through employment of relatively simple and rugged and inexpensively manufactured structural elements.

I claim:

1. In an aircraft, a generally streamlined body, said body having a cavity portion in the bottom thereof outlined by smoothly curved side wall portions, a shaft extending longitudinally of said body and disposed within said cavity portion, means mounting said shaft upon said body structure to be rotatable thereon, bracket means extending laterally from said shaft to rotate therewith, a cover plate carried by said bracket means and so arranged as to swing therewith into cavity closing position upon rotation of said shaft, pneumatic cell means carried by said bracket at the side thereof opposite to the position of said cover means and so arranged as to be extended outwardly and downwardly below said aircraft body for ground contact purposes upon rotation of said shaft in the opposite direction, and cell folding frame means pivotally mounted upon said bracket and spring-pressed to pivot inwardly against the cell fabric to fold the latter into compactly nested condition within said cavity upon pivoting of said shaft and bracket and cover plate into their retracted positions.

2. In an aircraft, a generally streamlined body, said body having a cavity portion in the bottom thereof outlined by smoothly curved side wall portions, a pair of shafts extending in parallel spaced relation inside opposite walls of said body and disposed within said cavity portion, means mounting said shaft upon said body structure to be rotatable thereon, bracket means extending laterally from said shafts to rotate therewith, cover plates carried by said bracket means and so arranged as to swing therewith into cavity closing position upon rotation of said shafts in opposite directions in one sense, pneumatic cell means carried by said brackets and so arranged as to be extended when inflated outwardly and downwardly below said aircraft body for ground contact purposes upon rotation of said shafts in opposite direction in the other sense, and cell folding frame means pivotally mounted upon said brackets and spring-pressed to pivot inwardly against the cell fabric to fold the latter into compactly nested condition within said cavity upon pivoting of said shafts and brackets and cover plate into their retracted positions.

3. In an aircraft, a generally streamlined body, said body having a cavity portion in the bottom thereof outlined by smoothly curved side wall portions, a pair of shafts extending in parallel spaced relation adjacent opposite walls of said body and disposed within said cavity portion, means mounting said shaft upon said body structure to be rotatable thereon, bracket means extending laterally from said shafts to rotate therewith, cover plates carried by said bracket means and so arranged as to swing therewith into cavity closing position upon retraction rotation of said shafts, pneumatic cell means carried by said brackets arranged as to be extended when inflated outwardly and downwardly below said aircraft body for ground contact purposes upon extension rotation of said shafts, and cell folding frame means mounted upon said brackets and adapted to operate against the cell fabric when deflated to fold the latter into compactly nested condition within said cavity upon pivoting of said shafts and brackets and cover plate into their retracted positions.

4. In an aircraft, a generally streamlined body, said body having a cavity portion in the bottom thereof outlined by smoothly curved side wall portions, a pair of shafts extending in parallel spaced relation adjacent opposite walls of said body and disposed within said cavity portion, means mounting said shaft upon said body structure to be rotatable thereon, bracket means extending laterally from said shafts to rotate therewith, cover plates carried by said bracket means and so arranged as to swing therewith into cavity closing position upon retraction rotation of said shafts, pneumatic cell means carried by said brackets and so arranged as to be extended when inflated outwardly and downwardly below said aircraft body for ground contact purposes upon extension rotation of said shafts, cell folding means mounted upon said brackets and operable to fold the cells when deflated into compactly nested condition within said cavity upon pivoting of said shafts and brackets and cover plate into their retracted positions, and means for inflating and deflating said cells.

5. In an aircraft, a generally streamlined body, said body having a cavity portion in the bottom thereof outlined by smoothly curved side wall portions, a pair of shafts extending in parallel spaced relation adjacent opposite walls of said body and disposed within said cavity portion, means mounting said shaft upon said body structure to be rotatable thereon, bracket means extending laterally from said shafts to rotate therewith, cover plates carried by said bracket means and so arranged as to swing therewith into cavity closing position upon retraction rotation of said shafts, pneumatic cell means carried by said brackets and so arranged as to be extended when inflated outwardly and downwardly below said aircraft body for ground contact purposes upon extension rotation of said shafts, cell folding means pivotally mounted upon said brackets and operable to fold the cells when deflated into compactly nested condition within said cavity upon pivoting of said shafts and brackets and cover plate into their retracted positions, means for inflating and deflating said cells, and control means actuating said inflating-deflating means automatically coincident with extension-retraction movements of said shafts.

6. In a helicopter type aircraft, a body, said body having a cavity portion in a wall thereof, a cover plate carried by said body and arranged so as to be swingable to and from cavity closing position, collapsible pneumatic cell means attached to and carried by said cover plate to be nested within said cavity when said cover is in closed position and arranged to extend outwardly and downwardly from said cover plate when the latter is in open position and when said cell means is in inflated condition to thereby extend below said aircraft body for ground or water contact purposes, and cell folding frame means mounted upon said bracket and operable to fold said cell means when deflated into compactly nested condition with said cavity upon pivoting of said cover plate into closed position.

7. In a helicopter type aircraft, a body, said body having a cavity portion in each of opposite walls thereof, cover means carried by said body and arranged so as to be swingable to and from closing position relative to each of said cavity portions, collapsible pneumatic cell means attached to and carried by each of said cover means to be nested within said cavity portions when said covers are in closed position and arranged to extend outwardly and downwardly from said cover means when the latter are in open position and when said cell means are in inflated condition to thereby extend downwardly and outwardly in opposite directions from said aircraft body for ground or water contact purposes.

HERBERT L. BOWERS.

REFERENCES CITED

The following references are of record in the file of this patent:

UNITED STATES PATENTS

| Number | Name | Date |
| --- | --- | --- |
| 1,802,996 | Wurth | Apr. 28, 1931 |
| 2,306,269 | King | Dec. 22, 1942 |
| 2,320,574 | Dornier | June 1, 1943 |

FOREIGN PATENTS

| Number | Country | Date |
| --- | --- | --- |
| 49,151 | France | Aug. 22, 1938 |
| (Additional to No. 832,912) | | |